(12) United States Patent
Takano et al.

(10) Patent No.: US 8,308,833 B2
(45) Date of Patent: Nov. 13, 2012

(54) NONWOVEN FABRIC FOR FILTERS

(75) Inventors: Nobuyuki Takano, Kusatsu (JP);
Masashi Ito, Yamashina-ku (JP);
Makoto Nishimura, Otsu (JP)

(73) Assignee: Toray Industries, Inc., Tokyo (JP)

( * ) Notice: Subject to any disclaimer, the term of this patent is extended or adjusted under 35 U.S.C. 154(b) by 625 days.

(21) Appl. No.: 12/089,163

(22) PCT Filed: Sep. 27, 2006

(86) PCT No.: PCT/JP2006/319102
§ 371 (c)(1),
(2), (4) Date: Apr. 3, 2008

(87) PCT Pub. No.: WO2007/040104
PCT Pub. Date: Apr. 12, 2007

(65) Prior Publication Data
US 2010/0146921 A1      Jun. 17, 2010

(30) Foreign Application Priority Data

Oct. 4, 2005  (JP) ................................. 2005-290839

(51) Int. Cl.
*B01D 39/14*  (2006.01)

(52) U.S. Cl. ................ 55/486; 55/521; 55/524; 55/527; 55/528; 442/364; 442/382; 442/400; 442/401

(58) Field of Classification Search .................... 55/521, 55/522–528; 442/327–417; 210/483–510, 210/483–510.1; 428/212–218
See application file for complete search history.

(56) References Cited

U.S. PATENT DOCUMENTS

| | | | |
|---|---|---|---|
| 5,652,041 A * | 7/1997 | Buerger et al. | 428/198 |
| 5,667,562 A * | 9/1997 | Midkiff | 96/15 |
| 6,169,045 B1 * | 1/2001 | Pike et al. | 442/352 |
| 6,261,679 B1 * | 7/2001 | Chen et al. | 428/317.9 |
| 6,261,979 B1 * | 7/2001 | Tanaka et al. | 442/370 |
| 6,336,948 B1 * | 1/2002 | Inoue et al. | 55/486 |
| 6,409,785 B1 * | 6/2002 | Smithies et al. | 55/486 |
| 6,649,547 B1 * | 11/2003 | Arnold et al. | 442/345 |
| 6,686,303 B1 * | 2/2004 | Haynes et al. | 442/327 |
| 6,835,264 B2 * | 12/2004 | Sayovitz et al. | 156/183 |
| 2003/0077970 A1 * | 4/2003 | DeLucia et al. | 442/398 |
| 2003/0124941 A1 * | 7/2003 | Hwo et al. | 442/401 |
| 2003/0150199 A1 * | 8/2003 | Tanaka et al. | 55/486 |
| 2003/0181112 A1 * | 9/2003 | Ishikawa et al. | 442/76 |

(Continued)

FOREIGN PATENT DOCUMENTS

| | | |
|---|---|---|
| JP | 04180808 | 6/1992 |
| JP | 2000117026 | 4/2000 |
| JP | 2001248056 | 9/2001 |

(Continued)

OTHER PUBLICATIONS

International Search Report corresponding to International Application No. PCT/JP206/319102 dated Oct. 31, 2006.

*Primary Examiner* — Duane Smith
*Assistant Examiner* — Thomas McKenzie
(74) *Attorney, Agent, or Firm* — RatnerPrestia

(57) ABSTRACT

This invention relates to a nonwoven fabric for filters, in which a melt blown nonwoven fabric formed of polybutylene terephthalate or polypropylene terephthalate fibers with an average fiber diameter of 1 to 8 μm and a spunbonded nonwoven fabric formed of polyester-based fibers with an average fiber diameter of 10 to 30 μcm are laminated for integration.

7 Claims, 2 Drawing Sheets

U.S. PATENT DOCUMENTS

| | | | |
|---|---|---|---|
| 2004/0058609 A1* | 3/2004 | Bansal et al. | 442/400 |
| 2004/0077247 A1* | 4/2004 | Schmidt et al. | 442/382 |
| 2004/0083695 A1* | 5/2004 | Schultink et al. | 55/382 |
| 2004/0097158 A1* | 5/2004 | Rudisill et al. | 442/401 |
| 2004/0102122 A1* | 5/2004 | Boney et al. | 442/382 |
| 2004/0131836 A1* | 7/2004 | Thompson | 428/304.4 |
| 2004/0140582 A1* | 7/2004 | Frankfort et al. | 264/103 |
| 2004/0224136 A1* | 11/2004 | Collier et al. | 428/196 |
| 2004/0232030 A1* | 11/2004 | Koseki | 206/497 |

FOREIGN PATENT DOCUMENTS

| | | |
|---|---|---|
| JP | 2001276529 | 10/2001 |
| JP | 2003275519 | 9/2003 |
| JP | 2004019061 | 1/2004 |
| JP | 2004105829 | 4/2004 |
| JP | 2004124317 | 4/2004 |
| JP | 2004154760 | 6/2004 |
| JP | 2004290929 | 10/2004 |

* cited by examiner

NONWOVEN FABRIC FOR FILTERS

CROSS-REFERENCE TO RELATED APPLICATION

This application is the U.S. National Phase Application of PCT International Application No. PCT/JP2006/319102, filed Sep. 27, 2006 (incorporated by reference herein in its entirety), and claims priority of Japanese Patent Application No. 2005-290839, filed Oct. 4, 2005.

TECHNICAL FIELD

The present invention relates to a nonwoven fabric for filters excellent in dust collection performance and also excellent in mechanical properties and dimensional stability.

BACKGROUND ART

Various nonwoven fabrics have been proposed as materials of air filters for removing dust and liquid filters. Especially in recent years, thermo-compression type long fiber nonwoven fabrics excellent in stiffness are suitably used as pleated filters. Pleated filters allow low filtration air velocities since they can have wide filtration areas, and have such advantages as higher dust collection capability and lower mechanical pressure loss.

However, the conventional thermo-compression type long fiber nonwoven fabrics do not have sufficient collection capability, since the fiber diameters of the fibers constituting the nonwoven fabrics are about 10 μm at the smallest.

For example, patent reference 1 proposes a composite long fiber nonwoven fabric for filters consisting of fibers with a special cross sectional form. According to the technique, the nonwoven fabric for filters can have better mechanical properties and higher dimensional stability, but it cannot sufficiently collect dust particles with particle sizes smaller than several micrometers, since the fiber diameter of the component fibers is 2 to 15 decitex (dtex), that is, about 13 μm at the smallest.

Further, patent reference 2 proposes a nonwoven fabric for filters, in which multiplex nonwoven fabrics are laminated. The technique allows easy production of a nonwoven fabric for filters having a high unit area weight and also allows the production of a nonwoven fabric for filters with excellent air permeability. However, since the proposed nonwoven fabric is obtained by laminating and integrating a nonwoven fabric with a fiber diameter of 7 to 20 μm and a nonwoven fabric with a fiber diameter of 20 to 50 μm, etc., the obtained nonwoven fabric cannot sufficiently collect dust particles with particle sizes smaller than several micrometers.

On the other hand, as nonwoven fabrics for filters having higher dust collection performance, various nonwoven fabrics for filters containing ultra-fine fibers are proposed.

For example, patent reference 3 proposes a nonwoven fabric for filters, in which a nonwoven fabric with a low melting point and a nonwoven fabric containing ultra-fine fibers are laminated, wherein the nonwoven fabric with a low melting point is molten for integration. This technique allows the ultra-fine fibers to be contained in a nonwoven fabric, without being molten, and because of this feature, since fine voids can be kept among the fibers in the nonwoven fabric, a nonwoven fabric with excellent dust collection performance can be produced. However, this technique has such problems that since the ultra-fine fibers do not contribute to the integration of the nonwoven fabric at all, the ultra-fine fibers are liable to come off from the nonwoven fabric and that the rate of ultra-fine fibers cannot be made high. Furthermore, this technique is not excellent in view of productivity either, since the ultra-fine fibers are obtained by treating a nonwoven fabric likely to be split into ultra-fine fibers by a high pressure liquid flow, needle punching or buckling treatment.

Moreover, patent reference 4 proposes a nonwoven fabric for filters with a unit area weight of 10 to 50 $g/m^2$, consisting of a nonwoven fabric composed of ultra-fine fibers with a fiber diameter of 1 to 6 μm and a nonwoven fabric composed of long fibers with a fiber diameter of 10 to 30 μm. This technique can provide a nonwoven fabric small in the leak of powder when coffee powder or the like is extracted. However, since the nonwoven fabric provided by this technique has a unit area weight of about 10 to about 50 $g/m^2$, it does not have the sufficient strength for allowing the use as an industrial filter. Further, this technique requires that the apertures on the surface of the long fiber nonwoven fabric are covered with the ultra-fine fibers. So the production method is complicated. Furthermore, the nonwoven fabric of this technique consists of the ultra-fine fiber nonwoven fabric as a melt blown nonwoven fabric and the long fiber nonwoven fabric as a spunbonded nonwoven fabric and the raw material is a polyester resin or a polyolefin resin. However, the use of a polyester resin as the raw material has such a problem that since the polyester of the melt blown nonwoven fabric is often insufficient in oriented crystallization, the sheet is cured or remarkably shrunken in the case of thermal bonding. Further, the use of the nonwoven fabric as a filter has such a problem that in a high temperature service environment, the sheet is cured or shrunken. On the other hand, the use of a polyolefin resin as the raw material has such problems that heat resistance is low since the melting point is low, and that since the sheet is soft in touch the use of it especially as a pleated filter is not preferred. Moreover, in the case where the resin of the melt blown nonwoven fabric is different from that of the spunbonded nonwoven fabric there is a problem that since the compatibility between the resins is insufficient the integration by thermal bonding is difficult.

[Patent reference 1] JP2001-276529A
[Patent reference 2] JP2004-124317A
[Patent reference 3] JP2001-248056A
[Patent reference 4] JP2004-154760A

DISCLOSURE OF THE INVENTION

Problems to be Solved by the Invention

In view of the abovementioned problems of the prior art, the present invention provides a nonwoven fabric for filters excellent in mechanical strength and dimensional stability and also excellent in dust collection performance.

Means for Solving the Problems

This invention employs the following means for solving the problems.
(1) A nonwoven fabric for filters, characterized in that a melt blown nonwoven fabric formed of fibers with an average fiber diameter of 1 to 8 μm containing polybutylene terephthalate or polytrimethylene terephthalate and a spunbonded nonwoven fabric formed of polyester fibers with an average fiber diameter of 10 to 30 μm are laminated for integration.
(2) A nonwoven fabric for filters, according to said (1), wherein the spunbonded nonwoven fabric is composed of polyethylene terephthalate only.

(3) A nonwoven fabric for filters, according to said (1) or (2), wherein the spunbonded nonwoven fabric is formed of core-sheath fibers having polyethylene terephthalate contained in the core component and having a copolyester with a melting point lower than that of the core component contained in the sheath component.

(4) A nonwoven fabric for filters, characterized in that a melt blown nonwoven fabric formed of fibers with an average fiber diameter of 1 to 8 μm and a spunbonded nonwoven fabric formed of core-sheath fibers with an average fiber diameter of 10 to 30 μm are laminated for integration, wherein the fibers of the melt blown nonwoven fabric and the sheath component of the core-sheath fibers of the core-sheath type spunbonded nonwoven fabric contain polybutylene terephthalate or polytrimethylene terephthalate while the core component of the core-sheath type spunbonded nonwoven fabric contains polyethylene terephthalate.

(5) A nonwoven fabric for filters, according to any one of said (1) through (4), wherein the integral lamination interface between the melt blown nonwoven fabric and the spunbonded nonwoven fabric has thermally compressed portions and the compressed area rate of the thermally compressed portions is 3 to 50%.

(6) A nonwoven fabric for filters, according to any one of said (1) through (5), wherein the entire unit area weight of the nonwoven fabric formed by the integral lamination is 80 to 300 g/m², and the rate by weight of the melt blown nonwoven fabric based on the entire unit area weight is 3 to 60%.

(7) A nonwoven fabric for filters, according to any one of said (1) through (6), wherein the collection efficiency of polystyrene dust with a particle size of 0.3 to 0.5 μm is 50 to 100%.

(8) A nonwoven fabric for filters, according to any one of said (1) through (7), which is plated.

(9) A nonwoven fabric for filters, according to any one of said (1) through (8), wherein the filters are industrial filters.

EFFECTS OF THE INVENTION

This invention can provide a nonwoven fabric for filters excellent in mechanical strength and thermal stability and also excellent in dust collection performance.

MEANINGS OF SYMBOLS

Figure 1:
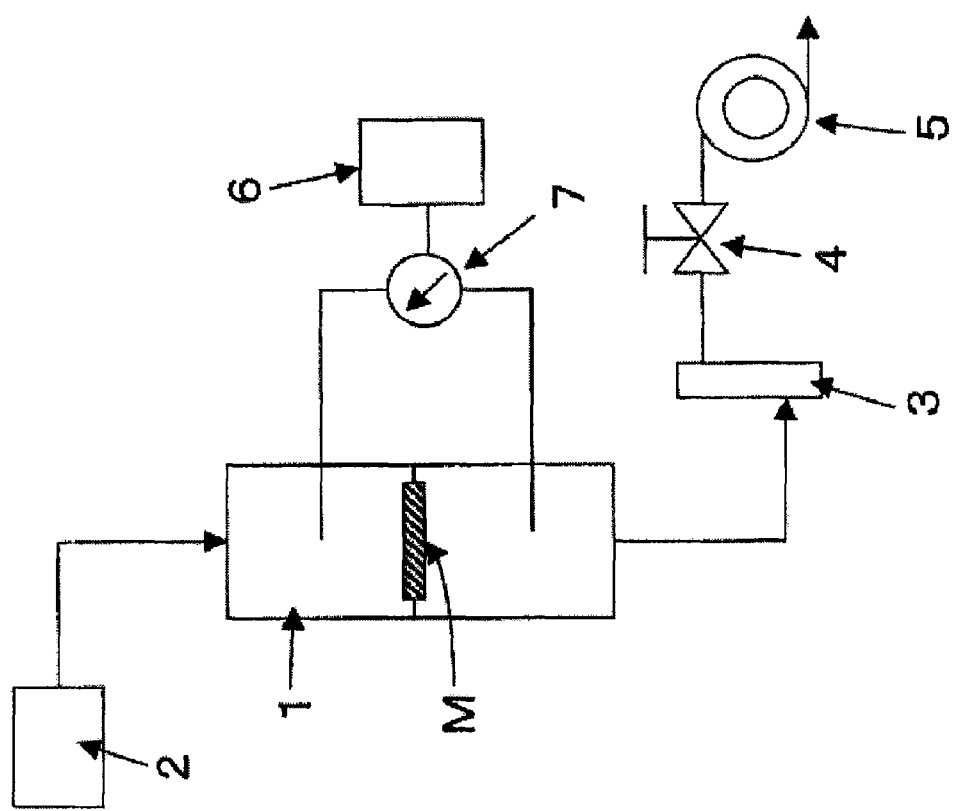
[FIG. 1] is a schematic drawing showing a collection performance measuring instrument.

1 Sample holder
2 Dust accommodation box
3 Flow meter
4 Flow control valve
5 Blower
6 Particle counter
7 Change-over cock
8 Core component of core-sheath fiber (multi-lobed form)
9 Sheath component of core-sheath fiber (multi-lobed form)
M Sample to be measured

THE BEST EMBODIMENT FOR CARRYING OUT THE INVENTION

The melt blown nonwoven fabric of the present invention is produced by a so-called melt blowing method, typically by a method comprising the steps of extruding a molten polymer from a die as filaments, blowing them with a heated high velocity fluid, etc., for stretching them, to thereby form ultra-fine fibers, and collecting them as a sheet.

The average fiber diameter of the fibers constituting the melt blown nonwoven fabric is 1 to 8 μm. A preferred range is 2 to 7 μm. An average fiber diameter of smaller than 1 μm is not preferred for such reasons that when the polymer is stretched to form ultra-fine fibers, the fibers are liable to be broken allowing polymer lamps to be mixed, and that the air permeability of the nonwoven fabric tends to decline. An average fiber diameter of larger than 8 μm is not preferred either, since the fibers become so thick that there arises a tendency of lowering dust collection performance. Meanwhile, the average fiber diameter in this specification is obtained by taking 10 small piece samples at random from a nonwoven fabric, taking 500× to 3000× photographs using a scanning electron microscope, etc., measuring the diameters of 10 fibers of each sample, namely, 100 fibers in total, averaging the diameters, to obtain a mean value, and rounding the fractional part of the mean value.

Further, the melt blown nonwoven fabric of the present invention contains polybutylene terephthalate or polytrimethylene terephthalate, and it is desirable that either of them is a main ingredient. Particularly it is preferred that the content of either of them is 50 wt % or more. More preferred is 70 wt % or more, and further more preferred is 90 wt % or more. A melt blown woven fabric composed of polybutylene terephthalate or polytrimethylene terephthalate is preferred, for such a reason that since it has a relatively high melting point, it is excellent in heat resistance and thermal dimensional stability. A melt blown nonwoven fabric composed of polybutylene terephthalate is especially preferred for such reasons that the thermal dimensional stability is high and that the die is less contaminated when a molten polymer is extruded.

Further, a crystal nucleating agent, matting agent, pigment, mildew proofing agent, antimicrobial agent, flame retardant, hydrophilizing agent, etc. can also be added to the raw resin of the melt blown nonwoven fabric to such an extent that the effects of the present invention are not impaired. Furthermore, the raw resin can also contain a slight amount of a comonomer, unless the intended functions of this invention are not impaired.

The spunbonded nonwoven fabric used in the present invention is produced by a so-called spun bond method, typically by a method comprising the steps of extruding a molten polymer from a die as filaments, sucking and stretching them by a high velocity suction gas, etc., collecting them on a moving conveyor, to form a web, continuously performing heat treatment, entanglement, etc., to form a sheet.

The average fiber diameter of the fibers constituting the spunbonded nonwoven fabric is 10 to 30 μm. A preferred range is 12 to 25 μm. It is not preferred that the average fiber diameter is smaller than 10 μm, for such reasons that the air permeability of the nonwoven fabric declines and that the stiffness of the nonwoven fabric also tends to decline. Further, since fiber breaking is liable to occur when the spunbonded nonwoven fabric is produced, the small fiber diameter is rather not preferred in view of production stability either. It is not preferred either in view of production stability that the average fiber diameter is larger than 30 μm, since fiber breaking is liable to occur due to poor cooling of filaments when the spunbonded nonwoven fabric is produced. The average fiber diameter in this specification is obtained by taking 10 small piece samples from a nonwoven fabric, taking 500× to 3000× photographs using a scanning electron microscope, etc., measuring the diameters of 10 fibers of each sample, namely, 100 fibers in total, averaging the diameters, to obtain a mean value, and rounding the fractional part of the mean value.

Further, the spunbonded nonwoven fabric is a polyester nonwoven fabric. A polyester nonwoven fabric is preferred, since it is excellent in heat resistance because of high melting point and is also excellent in stiffness. As the polyester nonwoven fabric, a spunbonded nonwoven fabric composed of polyethylene terephthalate only or a spunbonded nonwoven fabric formed of core-sheath fibers consisting of a core component containing polyethylene terephthalate and a sheath component containing a copolyester with a melting point lower than that of the polymer of the core component is preferred in view of the strength and the stiffness of the nonwoven fabric. It is preferred that the melting point of the copolyester is 15° C. or more lower than that of the polyethylene terephthalate contained in the core component. Further, it is preferred that the copolyester is a polyethylene terephthalate copolymer, and that the comonomer is isophthalic acid or adipic acid.

Further, it is preferred that the spunbonded nonwoven fabric is formed of core-sheath fibers, that the core component contains polyethylene terephthalate while the sheath component contains polybutylene terephthalate or polypropylene terephthalate, and that the polymer of the sheath component is structurally similar to the melt blown nonwoven fabric. In the most preferred mode, the polymer of the sheath component is the same as that of the melt blown nonwoven fabric. In the case where such core-sheath fibers are employed, since the polyethylene terephthalate used as the core component has a melting point higher than that of the polymer used as the sheath component, the core component is unlikely to be damaged when the spunbonded nonwoven fabric is thermo-compressed with the melt blown nonwoven fabric. Therefore, the strength and the stiffness of the nonwoven fabric can be enhanced. Furthermore, if the polymer of the sheath component is structurally similar to that of the melt blown nonwoven fabric or especially identical with the polymer of the melt blown nonwoven fabric, the compatibility between the melt blown nonwoven fabric and the spunbonded nonwoven fabric becomes good, and a strong integral structure can be formed by thermo-compression. An especially preferred combination consists of a melt blown nonwoven fabric composed of polybutylene terephthalate and a spunbonded nonwoven fabric formed of core-sheath fibers using polybutylene terephthalate as the sheath component.

Figure 2:
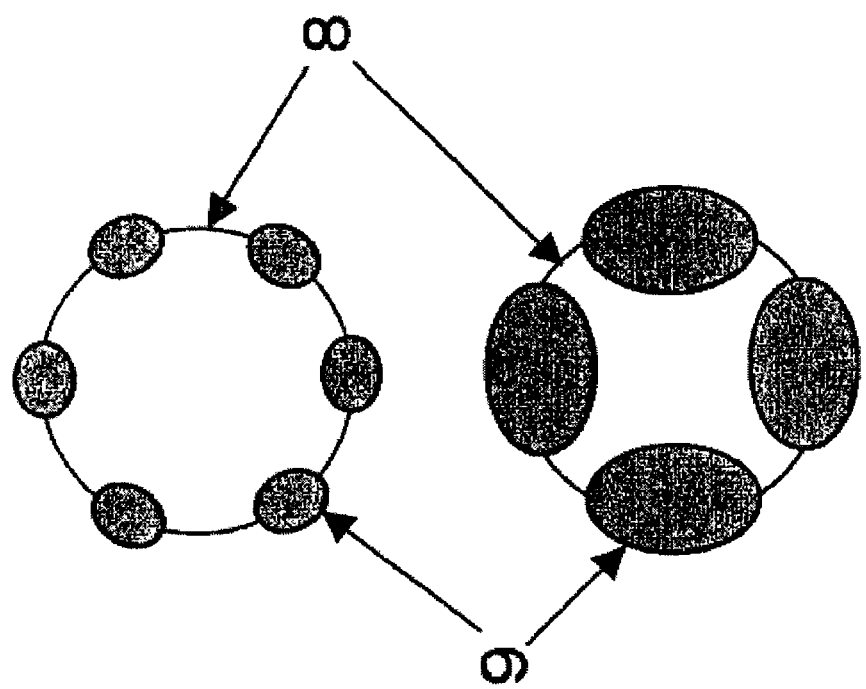
[FIG. 2] is a schematic drawing showing multi-lobed forms of core-sheath fibers.

A core-sheath fiber preferred in the present invention is a fiber in which a core component is concentrically or eccentrically surrounded by a sheath component, or in which a core component is surrounded by multiple lobes arranged as a sheath component. A multi-lobe form, for example, refers to either of the forms shown in FIG. 2. The most preferred core-sheath fiber is a concentric core-sheath fiber in view of production simplicity. The ratio by weight of core : sheath is not especially limited, but a preferred range of the ratio is 30:70 to 95:5. A more preferred range is 40:60 to 90:10.

The cross sectional form of the fibers constituting the spunbonded nonwoven fabric is not especially limited. Preferred forms include a circle, hollow circle, ellipse, flat, special forms such as X and Y, polygon, multiple lobes, etc. The fiber diameter of a non-circular fiber can be obtained by averaging the diameter of the circumscribed circle and the diameter of the inscribed circle respectively drawn for the sectional form of the fiber.

Further, a crystal nucleating agent, matting agent, pigment, mildew proofing agent, antimicrobial agent, flame retardant, hydrophilizing agent, etc. can also be added to the raw resin of the spunbonded nonwoven fabric to such an extent that the effects of this invention are not impaired. Furthermore, the raw resin can also contain a slight amount of a comonomer, unless the intended functions of this invention are not impaired.

It is preferred that the integration of the melt blown nonwoven fabric and the spunbonded nonwoven fabric in the present invention is achieved by performing partial thermo-compression. It is also a preferred method to perform partial thermo-compression after performing mechanical entanglement by means of water jet punching or needle punching. The partial thermo-compression method is not especially limited. Bonding by using a pair of hot emboss rolls or bonding by using an ultrasonic oscillator and an emboss roll is preferred. It is preferred that the temperature for thermal bonding by using hot emboss rolls is 5 to 50° C. lower than the melting point of the fibers constituting the melt blown nonwoven fabric. A more preferred temperature is 10 to 40° C. lower. If the temperature of thermal bonding by using hot emboss rolls is less than 5° C. lower than the melting point of the fibers constituting the melt blown nonwoven fabric, the resin is heavily molten, and the sheet adheres to the emboss rolls, to contaminate the rolls, and is hardened and frequently wound around the rolls, not allowing stable production. Further, if the temperature is more than 50° C. lower than the melting point of the fibers constituting the melt blown nonwoven fabric, the fusion bonding of the resin is insufficient, and the integrated nonwoven fabric tends to be weak in physical properties.

In the case where the partial thermo-compression is performed, it is preferred that the compressed area rate based on the total area of the nonwoven fabric is 3 to 50%. A more preferred range is 5 to 40%. It is not preferred that the compressed area rate is lower than 3%, for such reasons that the integration between the melt blown nonwoven fabric and the spunbonded nonwoven fabric is insufficient, to cause delamination between the nonwoven fabrics and that the strength of the integrated nonwoven fabric tends to decline. It is not preferred either that the compressed area rate is more than 50%, for such reasons that the fibers molten and deformed by thermo-compression increase and that the voids among the fibers decrease in a tendency to lower dust collection performance. Meanwhile, the compressed area rate of the thermally compressed portions refers to the rate of the thermally compressed portions where the melt blown nonwoven fabric and the spunbonded nonwoven fabric are integrated with each other to the total contact area between both the nonwoven fabrics, and does not include the area of the thermo-compression performed when the spunbonded nonwoven fabric only is once manufactured.

The method for laminating the melt blown nonwoven fabric and the spunbonded nonwoven fabric in the present invention is not limited at all, and can be a method comprising the steps of producing a melt blown nonwoven fabric and a spunbonded nonwoven fabric respectively and laminating them for integration, a method comprising the steps of once producing a spunbonded nonwoven fabric, and blowing filaments for lamination onto the spunbonded nonwoven fabric by a melt blow method, or a method comprising the steps of once producing a melt blown nonwoven fabric and blowing filaments for lamination onto the melt blown nonwoven fabric by a spun bond method, or by combining these methods. A method comprising the steps of continuously laminating a melt blown web and a spunbonded web, and integrating them by thermo-compression, etc. for forming a nonwoven fabric can also be used.

Further, the lamination type of a melt blown nonwoven fabric (M) and a spunbonded nonwoven fabric (s) in the present invention is not especially limited. SM lamination, SMS lamination, SMMS lamination, etc. are preferred types (meanwhile, for example, SMS lamination means a lamination in which one melt blown nonwoven fabric is kept between one each spunbonded nonwoven fabric). In the case where multiple melt blown nonwoven fabric layers or multiple spunbonded nonwoven fabrics are laminated, even if the respective nonwoven fabric layers are different from each other in the average fiber diameter and the fiber form of the fibers constituting each of the fabric layers, there is no problem at all if the respective average fiber diameters and the fiber forms are within the aforesaid ranges.

It is preferred that the unit area weight of the nonwoven fabric formed by integral lamination in this invention is in a range from 80 to 300 g/m². It is not preferred that the unit area weight is less than 80 g/m², since the nonwoven fabric may become insufficient in strength and stiffness. It is rather not preferred either that the unit area weight is more than 300 g/m², for such reasons that the air permeability tends to decline and that the cost increases, though the nonwoven fabric obtained by integral lamination is sufficient in strength and stiffness. A more preferred unit area weight range of the nonwoven fabric obtained by integral lamination is 100 to 270 g/m². The unit area weight in this specification can be obtained by taking and weighing three samples according to 5.2 of JIS L 1906 (2000), averaging the obtained values, calculating the weight per unit area from the mean value, and rounding the fractional part of the calculated value.

It is preferred that the rate by weight of the melt blown nonwoven fabric based on the weight of the nonwoven fabric obtained by integral lamination is 3 to 60%. A more preferred range is 5 to 50%. It is not preferred that the rate by weight of the melt blown nonwoven fabric is less than 3%, since dust collection performance tends to be too low. It is rather not preferred either that the rate by weight of the melt blown nonwoven fabric is more than 60%, for such reasons that the air permeability tends to decline and that the cost increases, though dust collection performance is excellent.

A mildew proofing agent, antimicrobial agent, flame retardant, hydrophilizing agent, pigment, dye, etc. can be partially or entirely added to the nonwoven fabric obtained by integral lamination in the present invention, to such an extent that the effects of this invention are not impaired.

Further, it is preferred that the nonwoven fabric for filters of the present invention is such that in the evaluation of dust collection performance described later in the paragraph of [Examples], or in the evaluation of dust collection performance capable of providing results equivalent to those obtained in said evaluation, the collection efficiency of polystyrene dust with a particle size of 0.3 to 0.5 μm is 50 to 100%. A more preferred collection efficiency range is 55 to 100%. It is not preferred that the collection efficiency is lower than 50%, since dust leak is large.

Since the nonwoven fabric for filters of this invention has excellent stiffness, it can be easily pleated and can excellently hold the pleated form. Therefore, a pleated filter is a preferred mode of the nonwoven fabric.

The nonwoven fabric for filters of the present invention is not limited in applications at all, but since it is excellent in mechanical strength and dimensional stability and also excellent in dust collection performance, it can be preferably used as industrial filters. Especially preferably, it can be used as pleated cylindrical units such as bag filters of dust collectors and liquid filters of electric discharge machines. Above all, especially in the case of a bag filter of a dust collector, the dust deposited on the surface layer of the filter is removed by backwashing air, and the nonwoven fabric of this invention with excellent strength can be preferably used as such a filter.

EXAMPLES

The present invention is explained below more particularly based on examples, but is not limited thereto or thereby. The aforesaid respective property values of nonwoven fabrics and the respective property values in the following examples were measured according to the following method.

(1) Melting Point (° C.)

A differential scanning calorimeter, DSC-2 produced by Perkin-Elmer, was used to measure at a temperature rise rate of 20° C./min, and the temperature at which the extreme value was given in the obtained melt heat absorption curve was identified as the melting point. Each sample was measured three times, and the mean value was employed as the melting point.

(2) Melt Viscosity (Poises)

A raw resin was dried to a water content of 80 wt ppm or less, and Capillograph 1B produced by Toyo Seiki Seisaku-Sho, Ltd. was used to measure at a measuring temperature of 280° C. and a strain rate of 6080 sec$^{-1}$ in a nitrogen atmosphere three times. The mean value was employed as the melt viscosity.

(3) Average Fiber Diameter (μm)

Ten small piece samples were taken at random from a nonwoven fabric, and 500× to 3000× photographs were taken using a scanning electron microscope. The diameters of 10 fibers of each sample, namely, 100 fibers in total were measured and averaged. The fractional part of the mean value was rounded.

(4) Unit Area Weight (g/m²)

Three samples of 50 cm in the lengthwise direction and 50 cm in the widthwise direction were taken and weighed according to 5.2 of JIS L 1906 (2000), and the obtained values were averaged. From the mean value, the weight per unit area was calculated, and the fractional part of the calculated value was rounded.

(5) Tensile Strength (N/5 cm)

According to 5.3.1 of JIS L 1906 (2000), three samples each of 5 cm×30 cm taken in the lengthwise direction and the widthwise direction of a sheet were tensile-tested at a grip interval of 20 cm and a stress rate of 10 cm/min. The maximum strength obtained when each sample was pulled till it was broken was identified as the tensile strength. The respective mean values in the lengthwise direction and in the widthwise direction of the sheet were calculated, and the fractional part of each mean value was rounded.

(6) Pleating Capability

A 1 m wide and 300 m long sample was pleated to have a fold height of 2.5 cm using a rotary pleating machine. The pleating capability was evaluated according to the following criterion.

○: Uniform pleats were formed without any problem in pleating.

Δ: Rather uneven pleats were formed.

x : Uneven pleats were formed with problem in pleating.

(7) Area Shrinkage Percentage (%)

The area shrinkage percentage of a melt blown nonwoven fabric was measured according to the following method.

In reference to 5.9.1 of JIS L 1906 (2000), three samples of lengthwise 25 cm×widthwise 25 cm were taken from arbitrary portions of a nonwoven fabric, and marks showing a length of 20 cm (measured to the unit of 0.01 cm) were put at three pairs of places each in the lengthwise and widthwise directions. The samples were allowed to stand at 90° C.±2° C.

in a constant-temperature dryer for 10 minutes, taken out and cooled to room temperature. The lengths between the marks put at three pairs of places each in the lengthwise and widthwise directions were measured to the unit of 0.01 cm, and the mean values in the lengthwise and widthwise directions were obtained. Each mean value was rounded to the $2^{nd}$ decimal place. The respective mean values were substituted into the following formula, and the obtained value was rounded to the first decimal place, to obtain the area shrinkage percentage.

Area shrinkage percentage (%)=100−(((L3×L4)/(L1× L2))×100)

where
L1: Mean value of lengths between marks in the lengthwise direction before heating (cm)
L2: Mean value of lengths between marks in the widthwise direction before heating (cm)
L3: Mean value of lengths between marks in the lengthwise direction after heating (cm)
L4: Mean value of lengths between marks in the widthwise direction after heating (cm)

(8) Dust Collection Performance (%)

The dust collection performance was measured according to the following method.

Three samples of 15 cm×15 cm were taken from arbitrary portions of a nonwoven fabric, and the collection performance of each sample was measured using the collection performance measuring instrument shown in FIG. 1. In the collection performance measuring instrument, a dust accommodation box 2 is connected upstream of a sample holder 1 for holding a test sample M, and a flow meter 3, a flow control valve 4 and a blower 5 are connected downstream of the sample holder 1. Further, a particle counter 6 is connected with the sample holder 1, and a changeover cock 7 can be switched to measure the number of dust particles on the upstream side of the test sample M or to measure the number of dust particles on the downstream side. For measuring the collection efficiency, 10 wt % polystyrene 0.309U solution (produced by Nacalai Tesque, Inc.) was diluted with distilled water to 200 times, and the dust accommodation box 2 was filled with the solution. Then, a sample M was set in the holder 1, and the flow control valve 4 was adjusted to achieve a filter passing rate of 3.0 m/min as air volume, for stabilizing the dust concentration in a range from 20,000 to 70,000 particles/ $(2.83×10^{-4} m^3 (0.01 ft^3))$. The number of upstream dust particles D2 and the number of downstream dust particles D1 of the sample M in a dust particle size range of 0.3 to 0.5μ were respectively measured by the particle counter 6 (KC-01D produced by RION Co., Ltd). The following formula was used for calculation, and the fractional part of the obtained value was rounded to obtain the collection efficiency (%). A collection efficiency of 50% or more was acceptable.

Collection efficiency (%)=[1−(D1/D2)]×100 where D1: Number of downstream dust particles (total of three times)
D2: Number of upstream dust particles (total of three times)

Production Example 1

Polybutylene terephthalate (PBT) with a melt viscosity of 390 poises and a melting point of 221° C. dried to a water content of 80 wt ppm or less was molten at 280° C., and the hot air volume and the cooling conditions were adjusted to achieve an average fiber diameter of 2 μm at a die temperature of 280° C. and a heating air temperature of 285° C., for producing a melt blown nonwoven fabric with a unit area weight of 30 g/m².

Production Example 2

Polytrimethylene terephthalate (PPT) with a melt viscosity of 500 poises and a melting point of 232° C. dried to a water content of 80 wt ppm or less was molten at 280° C., and the hot air volume and the cooling conditions were adjusted to achieve an average fiber diameter of 5 μm at a die temperature of 280° C. and a heating air temperature of 285° C., for producing a melt blown nonwoven fabric with a unit area weight of 30 g/m².

Comparative Example 1

Polyethylene terephthalate (PET) with a melt viscosity of 250 poises and a melting point of 255° C. dried to a water content of 80 wt ppm or less was molten at 285° C., and the hot air volume and the cooling conditions were adjusted to achieve an average fiber diameter of 7 μm at a die temperature of 285° C. and a heating air temperature of 285° C., for producing a melt blown nonwoven fabric with a unit area weight of 30 g/m².

TABLE 1

| Properties of melt blown nonwoven fabrics | | | | |
|---|---|---|---|---|
| | Polymer | Fiber diameter (μm) | Unit area weight (g/m²) | Area shrinkage percentage (%) |
| Production Example 1 | PBT | 2.2 | 30 | 7.0 |
| Production Example 1 | PPT | 5.2 | 30 | 9.4 |
| Comparative Example 1 | PET | 7.0 | 30 | 30.5 |

The physical properties of the obtained melt blown nonwoven fabrics were as shown in Table 1. The melt blown nonwoven fabrics of Production Examples 1 and 2 were low in heat shrinkage percentage (the area shrinkage percentage measured according to (7)) and excellent in dimensional stability. The melt blown nonwoven fabric formed of polyethylene terephthalate of Comparative Example 1 was high in heat shrinkage percentage and low in dimensional stability.

Production Example 3

Polyethylene terephthalate (PET) with a melt viscosity of 800 poises and a melting point of 260° C. dried to a water content of 80 wt ppm or less was molten at 295° C., and a copolyester (CO-PET) having an isophthalic acid copolymerization rate of 11 mol %, with a melt viscosity of 420 poises and a melting point of 230° C. dried to a water content of 80 wt ppm or less was molten at 280° C. With the polyethylene terephthalate as the core component and the copolyester as the sheath component, they were discharged at a die temperature of 300° C. from pores at a ratio by weight of core: sheath=80:20, spun by an ejector at a spinning rate of 4400 m/min, and the fibers were collected on a moving net conveyor, for obtaining a web. The web was thermally compressed between an emboss roll with a projection area of 16% and a flat roll at a temperature of 140° C. and a linear pressure of 60 kg/cm, to produce a spunbonded nonwoven fabric with a fiber diameter of 12 μm and a unit area weight of 50 g/m².

Production Example 4

Polyethylene terephthalate (PET) with a melt viscosity of 800 poises and a melting point of 260° C. dried to a water content of 80 wt ppm or less was molten at 295° C., and the polybutylene terephthalate (PBT) described in Production Example 1 and dried to a water content of 80 wt ppm or less was molten at 280° C. With the polyethylene terephthalate as the core component and the polybutylene terephthalate as the sheath component, they were discharged at a die temperature of 300° C. from pores at a ratio by weight of core:sheath=80:20 and spun by an ejector at a spinning rate of 4400 m/min, and the fibers were collected on a moving net conveyor, for obtaining a web. The web was thermally compressed between an emboss roll with a projection area of 16% and a flat roll at a temperature of 140° C. and a linear pressure of 60 kg/cm, to produce a spunbonded nonwoven fabric with a fiber diameter of 13 μm and a unit area weight of 50 g/m².

Production Example 5

A spunbonded nonwoven fabric with a unit area weight of 120 g/m² was produced under the same conditions as in Production Example 4, except that the ratio by weight of core:sheath was 60:40.

TABLE 2

Properties of spunbonded nonwoven fabrics

| | Polymer | Core:sheath | Fiber diameter (μm) | Unit area weight (g/m²) |
|---|---|---|---|---|
| Production Example 3 | PET/CO-PET | 80:20 | 12.4 | 50 |
| Production Example 4 | PET/PBT | 80:20 | 12.7 | 50 |
| Production Example 5 | PET/PBT | 60:40 | 12.7 | 120 |

Working Example 1

One each layer of the spunbonded nonwoven fabric composed of a polyester (PET/CO-PET-SB:S) obtained in Production Example 3 was laminated on both the surfaces of the melt blown nonwoven fabric composed of polybutylene terephthalate (PBT-MB:M) obtained in Production Example 1, and the layers (SMS lamination) were integrated using emboss rolls to achieve a compressed area rate of 16% at a temperature of 220° C. and a linear pressure of 60 kg/cm.

Working Example 2

One each layer of the spunbonded nonwoven fabric (PET/PBT-SB:S) obtained in Production Example 4 was laminated on both the surfaces of the melt blown nonwoven fabric composed of polybutylene terephthalate (PBT-MB:M) obtained in Production Example 1, and the layers (SMS lamination) were integrated using emboss rolls to achieve a compressed area rate of 16% at a temperature of 185° C. and a linear pressure of 60 kg/cm.

Working Example 3

One each layer of the spunbonded nonwoven fabric (PET/PBT-SB:S) obtained in Production Example 5 was laminated on both the surfaces of the melt blown nonwoven fabric composed of polybutylene terephthalate (PBT-MB:M) obtained in Production Example 1, and the layers (SMS lamination) were integrated using emboss rolls to achieve a compressed area rate of 16% at a temperature of 190° C. and a linear pressure of 60 kg/cm.

Working Example 4

Filaments were blown and collected according to the same method as that of Production Example 1, to form a polybutylene terephthalate melt blown nonwoven fabric (PBT-MB:M) with an average fiber diameter of 2 μm and a unit area weight of 25 g/m² for lamination on the spunbonded nonwoven fabric with a unit area weight of 50 g/m² (PET/PBT-SB:S) obtained in Production Example 4. Further, the spunbonded nonwoven fabric with a unit area weight of 125 g/m² (PET/PBT-SB:S) produced according to the same method as that of Production Example 4 was laminated, and the layers (SMS lamination) were integrated using emboss rolls to achieve a compressed area rate of 16% at a temperature of 195° C. and a linear pressure of 60 kg/cm.

TABLE 3

Properties of laminated nonwoven fabrics

| | 1st layer (nonwoven fabric: unit area weight) | 2nd layer (nonwoven fabric: unit area weight) | 3rd layer (nonwoven fabric: unit area weight) | Compressed area rate (%) | Unit area weight (g/m²) | Tensile strength (N/5 cm) Lengthwise | Tensile strength (N/5 cm) Widthwise | Pleating capability | Collection efficiency (%) |
|---|---|---|---|---|---|---|---|---|---|
| Working Example 1 | PET/CO-PET-SB: 50 g/m² | PBT-MB: 30 g/m² | PET/CO-PET-SB: 50 g/m² | 16 | 130 | 540 | 231 | ○ | 68 |
| Working Example 2 | PET/PBT-SB: 50 g/m² | PBT-MB: 30 g/m² | PET/PBT-SB: 50 g/m² | 16 | 130 | 531 | 205 | ○ | 64 |
| Working Example 3 | PET/PBT-SB: 120 g/m² | PBT-MB: 30 g/m² | PET/PBT-SB: 120 g/m² | 16 | 270 | 1373 | 405 | ○ | 75 |
| Working Example 4 | PET/PBT-SB: 50 g/m² | PBT-MB: 25 g/m² | PET/PBT-SB: 125 g/m² | 16 | 200 | 848 | 325 | ○ | 60 |
| Comparative Example 2 | PBT-MB | — | — | — | 60 | 74 | 98 | X | 94 |
| Comparative Example 3 | PET/CO-PET-SB | — | — | 16 | 130 | 610 | 273 | ○ | 15 |
| Comparative Example 4 | PET/CO-PET-SB | — | — | 18 | 270 | 1275 | 750 | ○ | 41 |

The properties of the obtained nonwoven fabrics were as shown in Table 3. The nonwoven fabrics of Working Examples 1 through 4 were excellent in tensile strength and had no problem in pleating capability. They were also good in dust collection efficiency, since all the efficiency values were higher than 50%.

Comparative Example 2

A melt blown nonwoven fabric (PBT-MB) was produced under the same conditions as those of Production Example 1, except that the unit area weight was 60 g/m².

Comparative Example 3

A web obtained by spinning the same raw materials under the same conditions as in Production Example 3 was thermally compressed using an emboss roll with a projection area rate of 16% and a flat roll at a temperature of 195° C. and a linear pressure of 60 kg/cm, to produce a spunbonded nonwoven fabric with a compressed area rate of 16%, a fiber diameter of 12 μm and a unit area weight of 130 g/m² (PET/CO-PET-SB).

Comparative Example 4

A web obtained by spinning the same raw materials under the same conditions as in Production Example 3 was thermally compressed using an emboss roll with a projection area rate of 18% and a flat roll at a temperature of 200° C. and a linear pressure of 60 kg/cm, to produce a spunbonded nonwoven fabric with a compressed area rate of 18%, a fiber diameter of 17 μm and a unit area weight of 270 g/m² (PET/CO-PET-SB).

The properties of the obtained nonwoven fabrics were as shown in Table 3. The melt blown nonwoven fabric of Comparative Example 2 was excellent in dust collection efficiency but weak in tensile strength, not allowing pleating. Further, the nonwoven fabrics of Comparative Examples 3 and 4 were excellent in tensile strength and good in pleating capability, but were as low as 15% and 41% respectively in dust collection efficiency.

[Industrial Applicability]

The nonwoven fabric for filters of the present invention can be suitably used especially as industrial air filters and liquid filters, since they are excellent in dust collection performance and also good in mechanical strength.

The invention claimed is:

1. A nonwoven fabric for filters in which a melt blown nonwoven fabric formed of fibers with an average fiber diameter of 1-8 μm and a spunbonded nonwoven fabric formed of core-sheath fibers with an average fiber diameter of 10 to 30 μm are laminated for integration, wherein the fibers of the melt blown nonwoven fabric and a sheath component of the core-sheath fibers of the spunbonded nonwoven fabric contain polybutylene terephthalate while a core component of the core-sheath fibers of the spunbonded nonwoven fabric contains polyethylene terephthalate, wherein the polymer composition of the sheath component of the core-sheath fibers of the spunbonded nonwoven fabric is the same as the polymer composition of the fibers of the melt blown nonwoven fabric.

2. A nonwoven fabric for filters, according to claim 1, wherein an integral lamination interface between the melt blown nonwoven fabric and the spunbonded nonwoven fabric has thermally compressed portions and a compressed area rate of the thermally compressed portions is 3 to 50%.

3. A nonwoven fabric for filters, according to claim 1, wherein an entire unit area weight of the nonwoven fabric formed by the integral lamination is 80 to 300 g/m², and a rate by weight of the melt blown nonwoven fabric based on the entire unit area weight is 3 to 60%.

4. A nonwoven fabric for filters, according to claim 1, wherein a collection efficiency of polystyrene dust with a particle size of 0.3 to 0.5 μm is 50 to 100%.

5. A nonwoven fabric for filters, according to claim 1, which is pleated.

6. A nonwoven fabric for filters, according to claim 5, wherein the filters are industrial filters.

7. A nonwoven fabric for filters, according to claim 1, wherein the fibers of the melt blown nonwoven fabric and a sheath component of the core-sheath fibers of the spunbonded nonwoven fabric consist essentially of polybutylene terephthalate.

* * * * *